(12) United States Patent
Sivertsen

(10) Patent No.: US 9,342,316 B1
(45) Date of Patent: *May 17, 2016

(54) INSTALLING DIGITAL SIGNAGE DEVICE OPERATING SYSTEM FROM FLASH MEMORY AND REGISTERING SIGNAGE DEVICE TO A GLOBAL NETWORK

(71) Applicant: AMERICAN MEGATRENDS, INC., Norcross, GA (US)

(72) Inventor: Clas Gerhard Sivertsen, Lilburn, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,698

(22) Filed: Dec. 12, 2013

(51) Int. Cl.
G06F 9/445 (2006.01)
G06F 9/44 (2006.01)

(52) U.S. Cl.
CPC .................. *G06F 9/4406* (2013.01)

(58) Field of Classification Search
None
See application file for complete search history.

(56) References Cited

U.S. PATENT DOCUMENTS

| | | | |
|---|---|---|---|
| 5,717,930 A * | 2/1998 | Imai et al. | 717/176 |
| 6,351,850 B1 * | 2/2002 | van Gilluwe et al. | 717/175 |
| 7,062,765 B1 | 6/2006 | Pitzel et al. | |
| 7,822,963 B2 * | 10/2010 | Willems | 713/2 |
| 8,866,911 B1 | 10/2014 | Sivertsen | |
| 2003/0041127 A1 | 2/2003 | Turnbull | |
| 2009/0198816 A1 | 8/2009 | Bannister et al. | |
| 2011/0119556 A1 | 5/2011 | de Buen | |
| 2013/0086577 A1 | 4/2013 | Nakashima et al. | |
| 2013/0252590 A1 * | 9/2013 | Sivertsen | 455/414.1 |
| 2014/0067549 A1 | 3/2014 | Park et al. | |

OTHER PUBLICATIONS

"How to Put Ubuntu Linux on a USB Thumb Drive (Without the Mess)." HowToGeek.com. N.p., Nov. 10, 2011. Web. Apr. 1, 2015. <http://www.howtogeek.com/97177/how-to-put-ubuntu-linux-on-a-usb-thumb-drive-without-the-mess/>.*

Danatela. "How to use manual partitioning during installation?" AskUbuntu.com. N.p., Sep. 9, 2013. Web. Apr. 1, 2015. <http://web.archive.org/web/20131109153541/http://askubuntu.com/questions/343268/how-to-use-manual-partitioning-during-installation>.*

(Continued)

*Primary Examiner* — Wei Zhen
*Assistant Examiner* — Binh Luu
(74) *Attorney, Agent, or Firm* — Locke Lord LLP; Tim Tingkang Xia, Esq.

(57) ABSTRACT

Certain aspects direct to a system for installing an operating system to a signage device from a flash memory of the signage device. In certain embodiments, the flash memory has a non-bootable partition, which stores a plurality of operating system images and an installer program. When booting the signage device, a boot program detects that no bootable device exists, and executes the installer program. The installer program receives a user input indicating one of the operating system images as a selected operating system image. Then, the installer program creates a partition in the flash memory, installs a copy of the selected operating system image in the partition as a bootable operating system, and configures the partition as the bootable device. Thus, when the signage device reboots, the boot program may detect the partition as the bootable device, and executes the bootable operating system.

24 Claims, 5 Drawing Sheets

(56) References Cited

OTHER PUBLICATIONS

Nhinkle. "Making the Ultimate All-In-One Installation Flash Drive." SuperUser.com. N.p., Dec. 22, 2011. Web. Mar. 24, 2015. <http://blog.superusercom/2011/12/22/making-the-ultimate-all-in-one-installation-flash-drive/>.*

Andrew. "How to Get Hardware Information in Linux." Web UPD8. N.p., Jul. 27, 2011. Web. Jan. 6, 2015. <http://www.webupd8.org/2011/07/how-to-get-hardware-information-in.html>.

DigitalSignage. "mediaBOX User's Manual version 3.0." DigitaiSignage. N.p., Nov. 14, 2009. Web. Jan. 6, 2015. <http://www.digitalsignage.com/files/mediaBOX_Manualv3.0.pdf>.

Leeky. "Step-by-step beginner's guide to installing Ubuntu 11.10." TechSpot. N.p., Oct. 15, 2011. Web. Jan. 6, 2015. <http://www.techspot.com/community/topics/step-by-step-beginners-guide-to-installing-ubuntu-11-10.172128/>.

Lev, Danny. "How to Manage your Digital Signage Network." ComQi. N.p., Nov. 2010. Web. Jan. 5, 2015.<http://www.comqi.com/wp-content/uploads/2013/01/How_to_Manage_your_Digitai_Signage_Network_White_Paper_ComQi_Branded.pdf>.

Stephftw. "How to Dual-boot Linux and Windows (on a PC with Windows 7 already installed)." Instructables.com. N.p., Jun. 11, 2012. Web. Jan. 5, 2015. <https://web.archive.org/web/20130318223232/http://www.instructables.com/id/How-to-Dual-boot-Linux-and-Windows-on-a-PC-with-W/?ALLSTEPS>.

Weideman, Jane, and Scott James Remnant. "Hardware/Detection." Ubuntu Wiki. N.p., Oct. 27, 2005. Web. Jan. 6, 2015. <https://wiki.ubuntu.com/Hardware/Detection>.

* cited by examiner

INSTALLING DIGITAL SIGNAGE DEVICE OPERATING SYSTEM FROM FLASH MEMORY AND REGISTERING SIGNAGE DEVICE TO A GLOBAL NETWORK

TECHNICAL FIELD

The present systems and methods relate generally to computer hardware and software systems for installing a specified operating system from flash memory of a digital signage device and authenticating the signage device to integrate the signage device into a global network of signage devices accessible via a common portal.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, embedded systems (i.e., computers used in specialty applications such as a digital signage device) boot firmware from flash memory, which is generally mounted on the motherboard of the embedded system. The firmware typically specifies a set of storage devices (i.e., bootable data storage devices) from which the embedded system may boot. These bootable data storage devices can include a hard drive, a CD-ROM drive, a floppy drive, a USB drive, etc. In most cases, however, these bootable data storage devices take up valuable space, particularly on the motherboard. The available size of a single flash memory chip, however, continues to increase while the associated cost continues to decrease, therefore making flash memory a preferred option as a bootable storage device.

Further, embedded systems often utilize an operating system that is specific to the particular application, be it a media center, vehicle infotainment device, etc. In particular, digital signage devices are typically preconfigured with their own operating system. Because of the varying operating systems of digital signage devices, however, it has been difficult to create a centrally-managed network of digital signage devices. Because it has been difficult to create and maintain a centrally-managed digital signage device network, signage device owners and advertisers have been unable to easily engage the services of one another, which leads to lost revenue for signage device owners and lost advertising opportunities for advertisers. By utilizing the rapidly-increasing size of flash memory, the embedded system could be provided with multiple operating systems.

Therefore, there is a long-felt but unresolved need for embedded systems with multiple operating systems that can be booted from flash memory. Further, there is a need for a digital signage device such that it is compatible with a centrally-managed global network of digital signage devices. Finally, there is a need to catalog and store signage device identifying information to authenticate signage devices and add the devices to a global network of managed signage devices.

BRIEF SUMMARY OF THE DISCLOSURE

Certain aspects of the present disclosure direct to a system, including a signage device. The signage device includes a processor and an electronic non-volatile computer storage device having a first partition. The first partition stores a plurality of operating system images, a computer-executable boot program, and a computer-executable installer program. The boot program, when executed at the processor, is configured to detect a bootable device of the signage device, when the bootable device does not exist in the signage device, execute the installer program at the processor, and when the bootable device exists in the signage device, mount the bootable device, and execute a bootable operating system stored in the bootable device. The installer program, when executed at the processor, is configured to receive a user input indicating one of the operating system images as a selected operating system image to be installed on the signage device, create a second partition in the electronic non-volatile computer storage device, install a copy of the selected operating system image in the second partition as the bootable operating system for the signage device, and configure the second partition as the bootable device for the signage device.

In certain embodiments, the electronic non-volatile computer storage device is a flash memory device.

In certain embodiments, the boot program is a Basic Input/Output System (BIOS) or a Unified Extensible Firmware Interface.

In certain embodiments, the bootable operating system includes a computer-executable program, when executed at the processor, configured to detect configuration information of the signage device, transmit the configuration information to a management server, and receive resources appropriate for the signage device from the management server, and install the resources on the signage device. In certain embodiments, the management server is configured to receive the configuration information from the signage device, determine the resources appropriate for the signage device based on the received configuration information, and transmit the resources to the signage device.

In certain embodiments, the configuration information includes information relating to the processor, disks, I/O devices, network devices, and software modules of the signage device.

In certain embodiments, the resources appropriate for the signage device include configuration parameters, device drivers, and software modules for the signage device.

In certain embodiments, the software modules include a device control module (DCM). In certain embodiments, the DCM, when executed at the processor, is configured to transmit system identifying information relating to the signage device to the management server.

In certain embodiments, the system identifying information comprises a signage device identifier, a signage device group identifier, and a signage device network identifier.

In certain embodiments, the management server is further configured to receive the system identifying information from the executed DCM; and register the signage device to a managed global network based on the system identifying information.

Certain aspects of the present disclosure direct to a method of installing an operating system for a signage device. In certain embodiments, the method includes: executing, at a processor of the signage device, a computer-executable boot program stored in a first partition of an electronic non-volatile computer storage device, wherein the first partition stores a plurality of operating system images, the boot program, and a computer-executable installer program; detecting, by the executed boot program, a bootable device of the signage device; when the bootable device does not exist in the signage device, executing, by the boot program, the computer-executable installer program stored in the first partition at the processor; receiving, at the executed installer program, a user input indicating one of the operating system images stored in the first partition as a selected operating system image to be installed on the signage device; creating, by the executed installer program, a second partition in the electronic non-volatile computer storage device; installing, by the executed installer program, a copy of the selected operating system image in the second partition as a bootable operating system for the signage device; and configuring, by the executed installer program, the second partition as the bootable device, wherein the bootable program, when re-executed at the processor, is configured to detect the second partition as the bootable device, mount the second partition, and execute the bootable operating system stored in the second partition.

In certain embodiments, the electronic non-volatile computer storage device is a flash memory device.

In certain embodiments, the boot program is a Basic Input/Output System (BIOS) or a Unified Extensible Firmware Interface.

In certain embodiments, the bootable operating system includes a computer-executable program, when executed at the processor, configured to detect configuration information of the signage device, transmit the configuration information to a management server, and receive resources appropriate for the signage device from the management server, and install the resources on the signage device. In certain embodiments, the management server is configured to receive the configuration information from the signage device, determine the resources appropriate for the signage device based on the received configuration information, and transmit the resources to the signage device.

In certain embodiments, the configuration information includes information relating to the processor, disks, I/O devices, network devices, and software modules of the signage device.

In certain embodiments, the resources appropriate for the signage device include configuration parameters, device drivers, and software modules for the signage device.

In certain embodiments, the software modules include a device control module (DCM). In certain embodiments, the DCM, when executed at the processor, is configured to transmit system identifying information relating to the signage device to the management server. In certain embodiments, the system identifying information comprises a signage device identifier, a signage device group identifier, and a signage device network identifier.

In certain embodiments, the management server is further configured to receive the system identifying information from the executed DCM; and register the signage device to a managed global network based on the system identifying information.

Certain aspects of the present disclosure direct to a non-transitory computer readable medium storing computer executable codes. The codes, when executed at a processor of a signage device, are configured to detect a bootable device for the signage device, wherein the signage device comprises an electronic non-volatile computer storage device having a first partition, wherein the first partition stores a plurality of operating system images and a computer-executable installer program, when the bootable device does not exist in the signage device, receive a user input indicating one of the operating system images as a selected operating system image to be installed on the signage device, create a second partition in the electronic non-volatile computer storage device, install a copy of the selected operating system image in the second partition as the bootable operating system for the signage device, and configure the second partition as a bootable device for the signage device such that in a rebooting process, the codes are configured to detect the second partition as the bootable device, mount the second partition, and execute the bootable operating system stored in the second partition.

In certain embodiments, the electronic non-volatile computer storage device is a flash memory device.

In certain embodiments, the bootable operating system includes a computer-executable program, when executed at the processor, configured to detect configuration information of the signage device, transmit the configuration information to a management server, and receive resources appropriate for the signage device from the management server, and install the resources on the signage device. In certain embodiments, the management server is configured to receive the configuration information from the signage device, determine the resources appropriate for the signage device based on the received configuration information, and transmit the resources to the signage device.

In certain embodiments, the configuration information includes information relating to the processor, disks, I/O devices, network devices, and software modules of the signage device.

In certain embodiments, the resources appropriate for the signage device include configuration parameters, device drivers, and software modules for the signage device.

In certain embodiments, the software modules include a device control module (DCM). In certain embodiments, the DCM, when executed at the processor, is configured to transmit system identifying information relating to the signage device to the management server. In certain embodiments, the system identifying information comprises a signage device identifier, a signage device group identifier, and a signage device network identifier.

In certain embodiments, the management server is further configured to receive the system identifying information from the executed DCM; and register the signage device to a managed global network based on the system identifying information.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
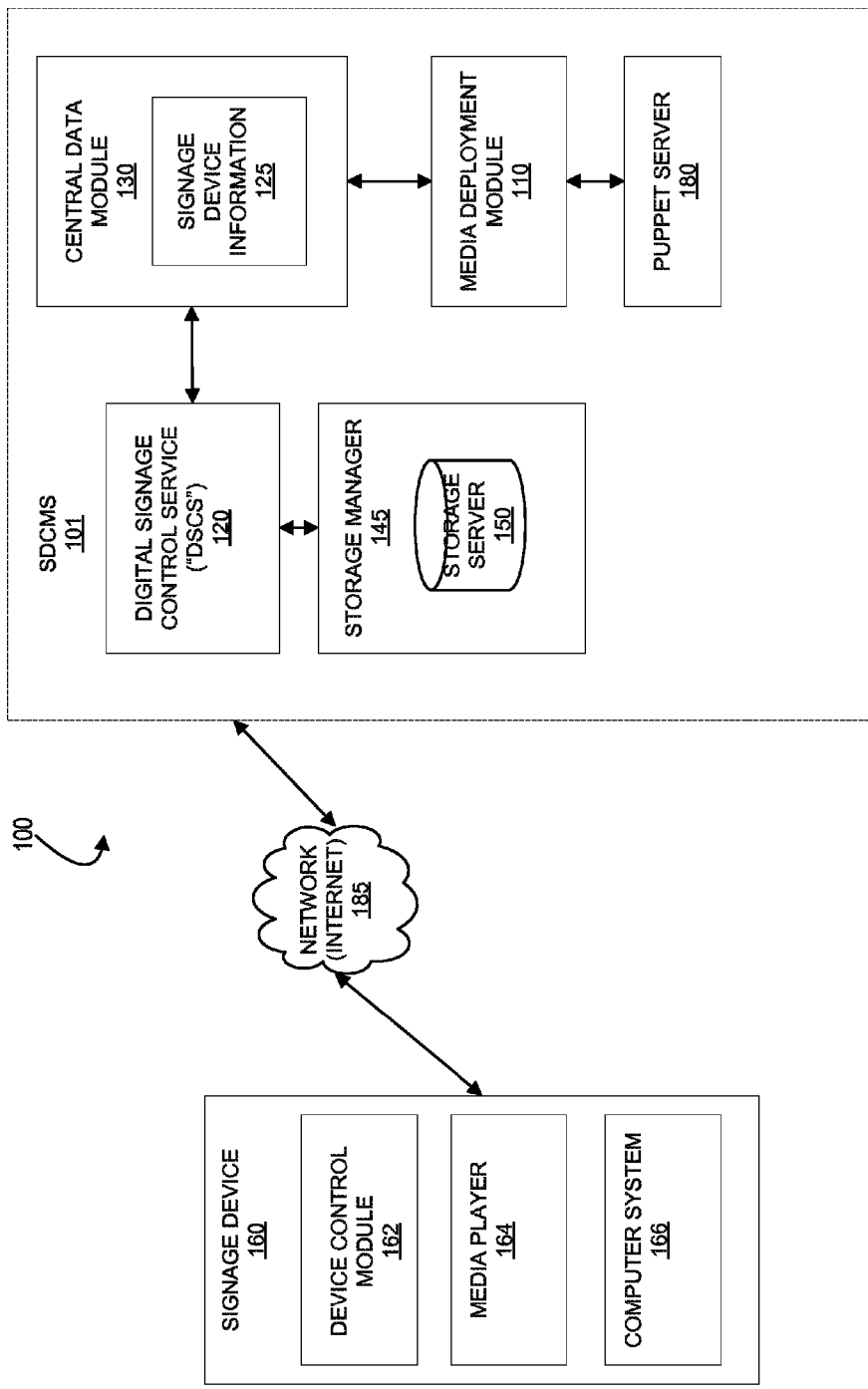
FIG. 1 illustrates an exemplary system environment in which an embodiment of a digital signage device central management system ("SDCMS") is utilized.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Aspects of the present disclosure relate generally to computer hardware and software systems for installing a specified operating system (OS) from flash memory of a digital signage device and authenticating the signage device to integrate the signage device into a global network of signage devices accessible via a common portal. According to one aspect, a digital signage device is capable of installing a specified operating system from one or more operating system images stored in flash memory, and subsequent to the installation of the central management system ("SDCMS") is capable of receiving software and hardware information from a digital signage device, transmitting additional software appropriate to the signage device, and registering the signage device as part of a global network of managed signage devices.

According to one embodiment, various OS images stored in the flash memory comprise an installer as well as software (i.e., puppet client), all of which are installed onto the digital signage device's existing computer system when specified. After installation of the OS and associated components onto the existing computer system, according to one embodiment, the puppet client analyzes the signage device's existing software and hardware and transmits the information to a puppet server at the SDCMS. The puppet server then returns additional software appropriate for the signage device as configured as well as various other configuration parameters, device drivers, and software modules, including a device control module ("DCM") for carrying out and coordinating the various computer-implemented processes of the signage device. The DCM then provides signage device identifying information (e.g., signage device ID) to the SDCMS such that the signage device can be authenticated and added to the global network of signage devices managed by the SDCMS.

Referring now to the figures, FIG. 1 illustrates an overview 100 of a digital signage device central management system ("SDCMS") 101 in an exemplary environment, constructed and operated in accordance with various aspects of the present disclosure. As shown in FIG. 1, the SDCMS 101 comprises a digital signage control service ("DSCS") 120 for carrying out and coordinating various computer-implemented processes of the SDCMS 101. The exemplary SDCMS 101 also comprises a central data module 130 for carrying out various other computer-implemented processes of the SDCMS 101. Embodiments of the SDCMS 101 further comprise various storage servers for storing system data and media content, such as storage server 150. Further embodiments of the SDCMS 101 comprise a puppet server 180 for delivering various content to digital signage devices associated with the SDCMS 101. Architectural details relating to various software modules, engines, and databases comprising an embodiment of the SDCMS 101 are described in greater detail below.

As discussed and according to the embodiment shown in FIG. 1, an SDCMS 101 comprises a DSCS 120, a central data module 130, and various other software engines, modules, and databases, which are operatively connected through a computer network 185. Typically, such operative connections involve a secure connection or communications protocol, and communications over a network typically involve the use of one or more services such as a Web-deployed service with client/server architecture, a corporate Local Area Network ("LAN") or Wide Area Network ("WAN"), or through a cloud-based system. According to a further embodiment not shown in FIG. 1, and as will be understood by one of ordinary skill in the art, an SDCMS 101 may comprise a unitary system, or the functionalities can be carried out by a consolidated system, and it is unnecessary for these systems to be separate and discrete.

The SDCMS 101 is in communication with a communication network 185 (such as the Internet). A digital signage device 160 is in communication with the communication network 185. Though not shown, in one embodiment, a signage device or private network of signage devices may communicate with the network 185 through an entry point such as a router. Although FIG. 1 only shows a single signage device 160, it will be understood and appreciated by one of ordinary skill in the art that one or more signage devices can be deployed in a private digital network, which is connected to the SDCMS 101. Further, multiple digital signage devices and multiple private networks may be connected to an SDCMS 101 directly through the network 185. Operative connections between an SDCMS 101 and a signage device 160 or a private network of signage devices can involve a secure connection or communications protocol. Moreover, in addition to routers, various networking components such as switches, hubs, etc., are typically involved in such communications, and although not shown in FIG. 1, certain embodiments of the present disclosure may include one or more secure networks, gateways, or firewalls that provide information security from unwanted intrusions and cyber-attacks.

Typically, digital signage devices (e.g., 160) as shown in FIG. 1 are configured to display digital media content. For example, digital signage devices can display facility-related announcements, weather updates, or multimedia content such as videos or movie clips. In certain aspects, such multimedia content may comprise an advertising campaign such as a commercial. For example, in a shopping mall, a network of digital signage devices could be configured to simultaneously display information relating to a promotion at a store in the shopping mall, followed by a weather report, then an announcement informing patrons that an escalator was out of service, and then a commercial for a new soft drink. In one embodiment, each digital signage device is equipped with a computer system 166, which may be a special-purpose computer system configured specifically for the digital signage device, which will be discussed further in relation to FIGS. 2A-2B. Further, as shown in the FIG. 1 embodiment, each digital signage device is equipped with a device control module ("DCM") 162 for carrying out and coordinating various computer-implemented processes of the digital signage device 160. In one embodiment, such processes include coordinating acquisition of information relating to various media campaigns from the SDCMS 101. Further, in one embodiment, a digital signage device is equipped with a media player 164 for displaying various media content on the signage device 160. The digital signage device computer system 166 will be discussed further in relation to FIG. 2.

As indicated, according to the embodiment shown in FIG. 1, the SDCMS 101 is in operative connection with signage device 160 via a network 185. According to one aspect, to prevent unwanted access to the signage device 160 by hackers or others with malicious intent, and to prevent unwanted content from being delivered to the signage device 160 via the network 185, the SDCMS 101 only responds to requests from the signage device 160, and sends no unsolicited content.

As indicated, according to the exemplary system architecture of an SDCMS 101 as shown in FIG. 1, an SDCMS 101 can be a scalable cloud system. As shown and discussed previously, an SDCMS 101 comprises at least a digital signage control service ("DSCS") 120, a central data module 130, a puppet server 180, and a storage service 150. According to one embodiment, the various components are servers or collections of modules comprising databases and various software as well as hardware. Further, according to one embodiment, components of an SDCMS 101 hosted in a cloud system can be operatively connected and communicate via a network 185 (i.e., via the Internet), as shown in FIG. 1, as noted.

According to one embodiment, an SDCMS 101 may comprise a media deployment module 110. In general, the media deployment module 110 in accordance with a user's instructions facilitates the deployment of one or more media files from one or more storage servers to one or more signage devices. The user can directly specify the selected timeslots and signage devices for displaying a media file. Alternatively, the user can specify certain criteria for selecting timeslots and signage devices for a specific campaign. The media deployment module 110 then utilizes certain determination logic to determine the specific timeslots and signage devices for displaying the media file in accordance with the user's criteria. Subsequently, according to one embodiment, the media deployment module 110 then generates a media deployment plan, which specifies which content is to be presenting on which signage devices at which times.

In certain embodiments, the central data module 130 provides a centralized data store for storing all or most information other than media files used by the SDCMS 101. Generally, the media files uploaded by the end users into the SDCMS 101 typically are stored in the storage server 150. The central data module 130, however, can store a collection of data specifying all the media files. Data relating to a particular media file can be organized in a particular media-file data structure. For example, data relating to a particular media file can include one or more of: the title of the file, the length of the file, the size of the file, the format of the file, a description of the contents of the file, a product category of the product being presented in an advertisement file, the target audience (e.g., demographic information) of the file, the target venues at which the file should be played. Further, the data also includes a storage link which can be used to retrieve the media file from the storage server 150.

Additionally, the central data module 130 can store a collection of data specifying each signage device (e.g., 160) managed by the SDCMS 101. Further, data relating to a particular signage device (e.g., 160) can be organized in a particular signage device data structure, as shown as signage device information 125. For example, data relating to the particular signage device 160 can include one or more of: a signage device ID identifying this particular signage device 160, one or more group IDs identifying one or more groups to which this particular signage device 160 belongs, one or more network IDs identifying the one or more networks to which this particular signage device 160 belongs, the popularity of the particular signage device 160, and the technical specification (e.g. resolution, size, 3-D features, etc.) of the particular signage device 160. As will be discussed, such signage device information 125 is received from the signage device 160 and may be used to authenticate the signage device 160 and register the signage device 160 as a part of the global network of signage devices managed by the SDCMS 101.

Further, the central data module 130 can store a collection of data specifying campaign deployment plans for each individual campaign, as discussed above. Further, data relating to a particular campaign deployment plan can be organized in a particular campaign-deployment-plan data structure. For example, data relating to a particular campaign deployment plan can include one or more of: a campaign ID identifying the campaign to which the particular deployment plan is directed, and one or more deployment entries. Each deployment entry can specify a content ID identifying a media file that is to be deployed, a group ID identifying the group of signage devices to which a media file should be deployed or a signage device ID identifying a particular signage device to which a media file should be deployed, a timeslot in which the deployed media file should be displayed, and a payment status indicating whether full, partial, or no payment has been remitted in relation to the campaign.

In one embodiment, the central data module 130 receives a write instruction from the media deployment module 110 specifying content and other information to be stored in the storage service in association with a particular campaign deployment plan.

According to FIG. 1 embodiment of the SDCMS 101 also comprises a DSCS 120, which is in communication with the signage device 160. In the presently disclosed embodiment, the DSCS 120 manages communications between the SDCMS 101 and the various signage devices (e.g., 160). As noted previously, according to one embodiment, the DSCS 120 only responds to requests from the DCM 162 of a signage device 160, and does not send unsolicited information.

According to one embodiment, the DSCS 120 is configured to receive certain signage device information from the signage device 160 that is used to authenticate the signage device 160. This information can further be used to register the signage device 160 to the global network of signage devices managed by the SDCMS 101. In one embodiment, such signage device information may include a signage device ID identifying a particular signage device (e.g., 160), one or more group IDs identifying one or more groups to which the signage device belongs, one or more network IDs identifying networks to which the device belongs, or other technical information relating to the device.

In one embodiment, the DSCS 120 can receive a campaign deployment instruction from the media deployment module 110. The campaign deployment instruction informs the DSCS 120 that a specific campaign is ready to be deployed to the intended signage devices. According to one embodiment, the campaign deployment instruction comprises the campaign ID. The DSCS 120 then can obtain a campaign deployment plan for that specific campaign. Based on the campaign deployment plan, the DSCS 120 can determine what media files should be distributed to which signage devices. Using the content IDs specified in the campaign deployment plan, the DSCS 120 can query the central data module 130 to obtain a storage link that can be used to retrieve the corresponding media file from the storage server 150. Further, the DSCS 120 can query the central data module 130 for the payment status associated with the timeslots specified in the campaign deployment plan.

In one embodiment, the DSCS 120 can generate a program list for each signage device specified in the campaign deployment plan. Typically, the program list will be specific to a particular signage device (identified by its signage device ID), and will include links to the media content that should be displayed on the signage device at a particular timeslot. Further, the program list may include the payment status for the particular timeslots. As will be understood and appreciated, generating a signage-device-specific program list makes it unnecessary to send the entire campaign deployment plan to each signage device specified in the plan. Then, the next time a signage device makes an inquiry to the DSCS 120 for available content to be delivered to that signage device, the DSCS 120 can transmit the program list to the signage device to inform the signage device of the media files and the associated storage links of the media files.

As noted, in certain embodiments, the media deployment module 110 instructs the DSCS 120 that a particular campaign is ready to be deployed by sending a campaign ID to the DSCS 120 in a message. Using the campaign ID, the DSCS 120 can retrieve a campaign deployment plan from the central data module 130. As described above, the campaign deployment plan specifies detailed information regarding a particular campaign such as what media files should be played at which signage device at which timeslots. In certain embodiments, a signage device can periodically send requests to the DSCS 120 to check if there are media files or program lists available to that signage device. The DSCS 120, in turn, can examine the campaign deployment plan to determine whether a program list or updated program list is to be deployed to that signage device and then informs the results to the signage device.

Further, according to the FIG. 1 embodiment, the SDCMS 101 comprises a puppet server 180 for managing various computer-implemented processes associated with managing the configuration and transmission of the preferred operating system and associated software modules, configuration parameters and device drivers, as will be discussed herein. In one embodiment, the puppet server 180 manages transmission of a device control module ("DCM") to the signage device, which allows the signage device to communicate with the DSCS 120 and thereby receive media content, program lists, etc.

According to the FIG. 1 embodiment, the puppet server 180 is configured to receive information from a signage device 160, via a puppet client 245 included as part of a specified installed OS (e.g., OS 1 240), as will be discussed in relation to FIG. 2A. Generally, information received by the puppet server 180 may include information relating to the signage device 160's various system resources, including both computer software and hardware information. In one embodiment, the puppet server 180 compiles and stores the information received from a specific signage device 160 and maintains a signage device-specific catalog containing the software and hardware information. The puppet server likewise determines various resource dependencies based on the received information and the device-specific catalog. In one embodiment, the puppet server 180 then provides the computer system 166 of the signage device 160 with appropriate resources (e.g., configuration parameters, device drivers, software modules) that allow the signage device 160 to be incorporated into the global network of signage devices managed by the SDCMS 101.

In one embodiment, the puppet server 180 maintains historical information relating to computer software and hardware information received from various signage devices and the various resource dependencies of those signage devices. Further, the puppet server 180 maintains historical information relating to the configuration parameters, device drivers, software modules, etc., designated for the various signage devices based on their hardware and software configurations. In certain embodiments, the puppet server 180 may maintain a multitude of "packages" (i.e., collections of configuration parameters, device drivers, software modules, etc.) designated for various signage device configurations.

In certain embodiments, the storage server 150 provides a mechanism to allow other components of the SDCMS 101 to store data objects in the storage server 150. For example, the storage server 150 can provide a write function that another component can call to pass on a data object. After receiving the data object, the storage server 150 stores the data object and generates a data-object identifier identifying the stored data object. The storage server 150 can return the data-object identifier back to the component requesting to store the data object. The storage server 150 can further provide a read function that another component can call to retrieve a data objects stored in the storage server 150 using a data-object identifier. As stated, the storage server 150 can retrieve the data object identified by the data-object identifier and return the retrieved data object back to the component requesting to retrieve the data object.

In certain embodiments, the storage server 150 operates in conjunction with a storage manager 145 to provide a distributed mechanism to deliver media files stored in the storage server 150 to signage devices. As has been discussed, each signage device (e.g., 160) periodically queries the DSCS 120 to check if any media file is ready to be deployed to that signage device 160. As discussed above, the DSCS 120 checks the current campaign deployment plan to determine whether there is any media file to be deployed to the inquiring signage device 160. As discussed, the DSCS 120 may also check the current campaign deployment play to determine whether payment has been remitted in relation to the plan. When there is a media file to be deployed, the DSCS 120 returns, among other things, the storage link of the media file. The storage link indicates the location of the storage manager and the data object identifier identifying the media file stored in the storage server 150. Subsequently, the storage manager 145 can then receive from a signage device 160 a request for a particular media file using a storage link. Based on the request, the storage manager 145 can then assist in the process of delivering the content to the signage device 160.

As indicated, according to the embodiment shown in FIG. 1, the SDCMS 101 is in operative connection with a signage device 160 via a network, which may be connected to a router or similar device, which manages communications between the various components of the SDCMS 101 and the signage device 160.

The discussions above in association with FIG. 1 are merely intended to provide an overview of an embodiment of the present system. Accordingly, it will be understood that the descriptions in this disclosure are not intended to limit in any way the scope of the present disclosure. Various architectural details of an embodiment of the disclosed SDCMS 101 will be described next in greater detail.

Figure 2A:
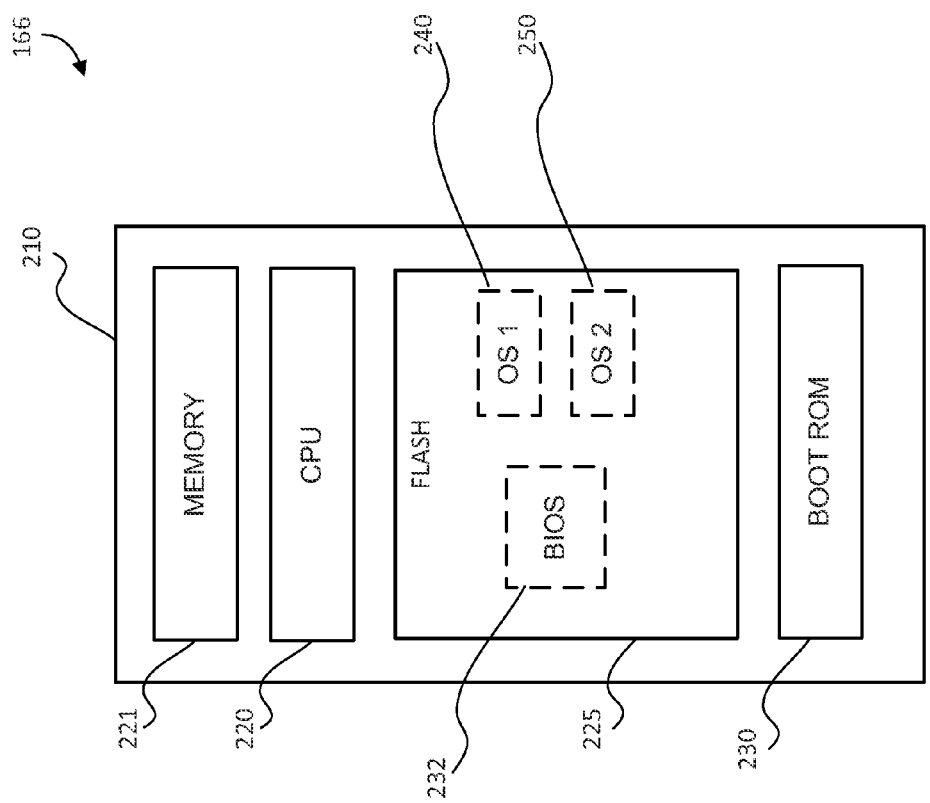
FIG. 2A schematically depicts an exemplary digital signage device computer system having multiple operating system images ("OS images") stored in flash memory, according to one embodiment of the present disclosure.

FIG. 2A schematically depicts a digital signage device computer system 166 according to one embodiment of the present disclosure. As shown in FIG. 2A, a computer system 166 is provided as an embedded computer for a digital signage device 160. The computer system 166 of FIG. 2A merely represents an exemplary embodiment of the present disclosure, and therefore should not be considered to limit the disclosure in any manner. In some embodiments, the computer system 166 may include other physical or virtual components not shown in FIG. 2A for purposes not mentioned in the disclosure.

In the computer system 166, a chassis 210 is provided to enclose various components or devices of the computer system 166. Although not explicitly shown in FIG. 2A, a baseboard is provided in the chassis 210, which is a printed circuit board upon which a plurality of interconnected components or devices may be disposed. The layout of the components on the baseboard and the manner of the interconnection between the components on the baseboard is herein referred to as the "configuration" of the baseboard. One of ordinary skill in the art would appreciate that the configuration of the baseboard may be adjusted or changed according to the necessary design or manufacturing requirements.

In one embodiment, the components in the chassis 210 include, but are not limited to, a central processing unit (CPU) 220, a memory 221, a boot rom 230, a flash memory 225, and other required memory and input/output modules (not shown). Further, according to one embodiment, the flash memory 225 contains a firmware interface at a predetermined location (address). In the FIG. 2A embodiment, the firmware interface shown is a Basic Input/Output System (BIOS) 232. It will be understood and appreciated that various options can be utilized as a firmware interface, including, for example, a Unified Extensible Firmware Interface (UEFI). The flash memory 225 of the FIG. 2A embodiment also contains images of two operating systems, OS1 240 and OS2 250, also in predetermined locations. As will be understood and appreciated, by utilizing a large enough flash memory, multiple OS's could be stored in the flash memory 225. In certain embodiments, the interface between the components may be physical hardware interface such as electrical connectors, buses, ports, cables, terminals, or other I/O devices. The CPU 220 is a host processor which is configured to control operation of the computer system 166. The CPU 220 can be any suitable type of processor such as an Intel X86 processor or an ARM processor, or various other microcontrollers. In some embodiments, one of ordinary skill in the art would appreciate that the computer system 166 may run on or more than one CPU as the host processor, such as two CPUs or any suitable number of CPUs.

In general, either of the operating systems (240 or 250) can be collective management software for managing the operation and resources of the computer system 166. For example, an OS 240 can include a set of functional programs that control and manage operations of the devices connected to the CPU 220. The set of application programs provide certain utility software for the user to manage the computer system 160. In certain embodiments, an OS 240 is operable to multitask, i.e., execute computing tasks in multiple threads, and may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8" operating systems, IBM's OS/2 WARP, APPLE's MACINTOSH OSX operating system, LINUX, UNIX, etc.

In certain embodiments, the OS 240, when booted, can launch one or more applications. For example, a downloader application can periodically download one or more media files from a network location and then store the media files in their original file format.

In certain embodiments, the boot rom 230 contains the initial code that the CPU 220 executes after a power-on or reset. For example, the initial code can include necessary code and configurations to initialize the flash memory 225. Then, the initial code can instruct the CPU 220 to load the BIOS 232 (or other boot program) from a predetermined location in the flash memory 225. In certain embodiments, the boot rom 230 can be a small piece of mask ROM or write-protected flash embedded inside the processor chip, an EPROM, etc.

The BIOS 232 serves as a crucial component of the computer system 166. The BIOS 232 is in communication with the CPU 220 and is configured for performing the booting functions and various other initialization and testing functions, as will be described below. Further, the BIOS 232 includes code and configurations that, when executed by the CPU 220, can detect a bootable device, an active partition of the bootable device, and an operating system of in the active partition. Generally, BIOS 232 is in communication with a complementary metal oxide semiconductor (CMOS) memory, and initial settings and configurations of the BIOS may be stored in the CMOS memory.

As noted, settings in the BIOS 232 may specify a set of storage devices (designated as "bootable data storage devices" or a "bootable devices") from which the computer system 166 may boot. In one embodiment, when the computer system 166 starts up, the first job for the BIOS 232 is the power-on self-test, which initializes and identifies the system hardware devices, such as the CPU 220, memory and storage devices, display card, keyboard and mouse, and other hardware devices. In general, the BIOS 232 brings the hardware of the computer system 166 to, at a minimum, a basic operable state.

The BIOS 232 then attempts to boot the computer system 166, i.e., instructs the CPU 220 to read and execute an OS (e.g., 242) from the devices as specified in the BIOS 232. Typically, the BIOS 232 attempts to load, i.e., instruct the CPU 220 to read and execute, the installer (i.e., boot loader software or install program) 260 from a specified device. The installer 260 then loads an OS (e.g., 240) from that bootable device. Thus, the CPU 220 can execute the OS (e.g., 240) and run an instance of the OS. Accordingly, the control of the computer system 166 is given to the OS 240. This process is known as booting, or booting up, which is short for bootstrapping.

According to one embodiment, the installer 260 is configured to receive a user input indicating a preferred OS to be installed on the computer system 166. In one embodiment, after the BIOS 232 brings the hardware of the computer system 166 up to a basic operable state and instructs the CPU to read and execute the installer 260, a user of the computer system 166 enters the computer system's setup mode. According to one aspect, the setup mode presents the user with each bootable data storage device included in the computer system 166 as well as the various operating systems stored on the respective bootable data storage devices. The user then selects which operating system to install from which bootable data storage device. For example, according to the presently disclosed embodiment, the user may choose to install OS1, the image of which (i.e., OS1 240) is stored in the flash memory 225.

Figure 2B:
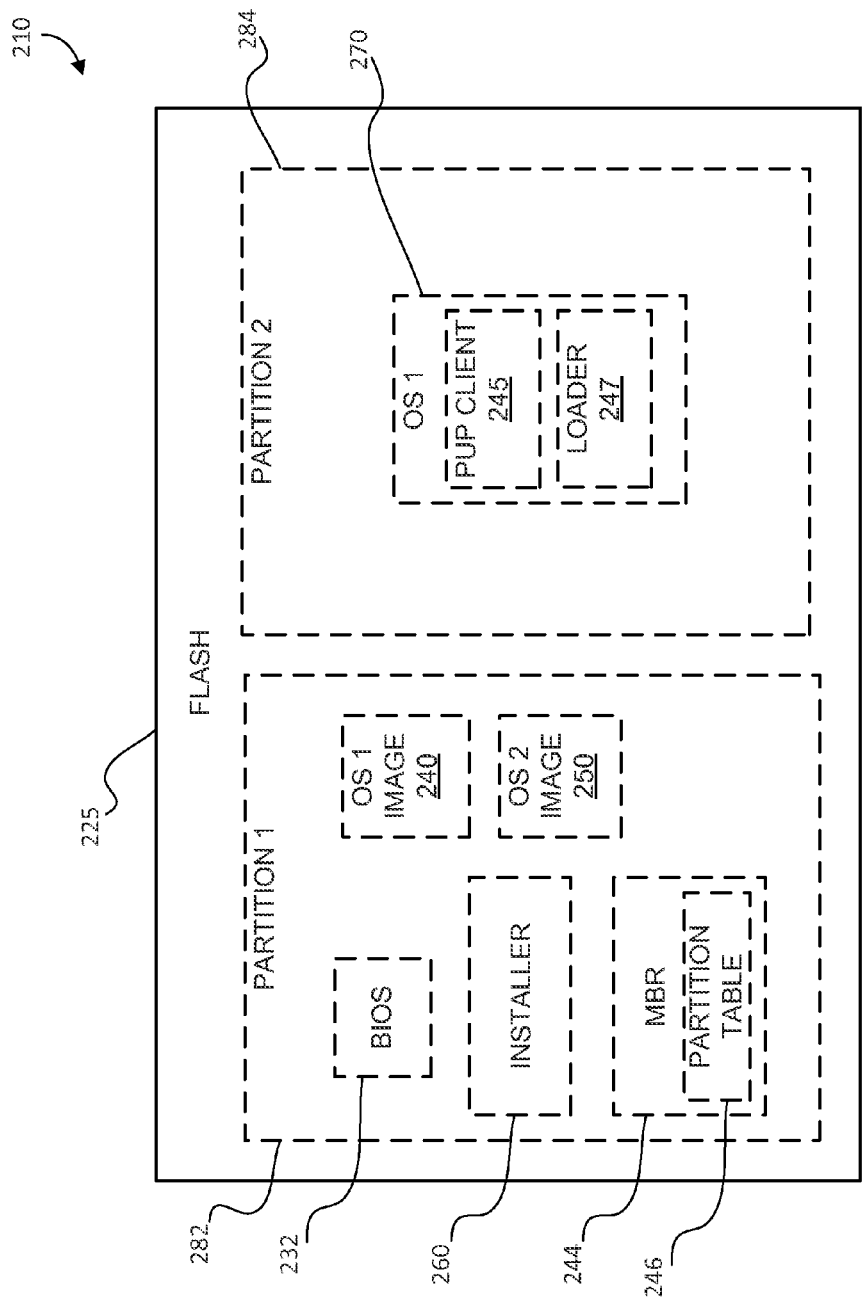
FIG. 2B schematically depicts a configuration of the flash memory of the flash memory of the computer system of FIG. 2A, according to one embodiment of the present disclosure.

In the FIG. 2A and FIG. 2B embodiments, the flash memory 225 stores the BIOS 232 as well as images of the operating systems, OS1 240 and OS2 250. Generally, the flash memory 225 stores information in an array of memory cells made from floating-gate transistors. Such a configuration is different in nature from other volatile or non-volatile memory because the information or data stored therein must be erased before new data can be written into the memory cells. In general, there are two main types of flash memory: NAND-type (named after NAND logic gates) and NOR-type (named after NOR logic gates). In a NAND-type flash memory, data may be written and read in "blocks" or "pages," which are the basic accessible memory units. The NOR-type flash memory allows a single machine word (i.e., byte) to be written or read independently. In either flash memory type, however, the erasing process is limited to erasing one block at a time. In other words, the flash memory 225 does not offer random-access erasing or rewriting operations.

In certain embodiments, the flash memory 225 includes one or more partitions as shown, for example, in FIG. 2B. Each partition represents one contiguous area of the flash memory 225. When the flash memory 225 includes multiple partitions, a system processor may read from one partition while completing a writing/erasing procedure in another partition. This permits cutting code and programming data in the same flash memory 225.

As noted, FIG. 2B schematically depicts the partitions (i.e., partition 1 282 and partition 2 284) of the flash memory 225 of the computer system 166, according to one embodiment of the present disclosure. It should be appreciated that FIG. 2B shows the partitions in the block form solely for the illustration purposes, and the actual partitions of the flash memory 225 may be different. As will be discussed, as shown in the FIG. 2B embodiment, partition 1 282 stores the BIOS 232, the installer 260, the master boot record (MBR) 244 having partition table 246, in addition to the images of OS1 240 and OS2 250. Partition 2 284 stores installed OS1 270 and the associated puppet client 245 and loader 247. In certain embodiments, the size of the partitions 1 and 2 may vary. Either partition (i.e., 282 or 284) can be an active bootable partition of the flash memory 225. In the FIG. 2B embodiment, OS1 270 has been configured to be run directly on the computer system 166. In other words, during a booting process, the BIOS 232 loads the existing OS1 270. In such an instance, the running instance of the existing OS1 270 can be the only operating system that manages the resources of the computer system 166. As noted, the flash memory 225 includes a master boot record (MBR) 244 having a partition table 246. According to one embodiment, the partition table 246 indicates, among other things, which of the partitions of the flash memory 225 is the active bootable partition. As shown in FIG. 2B, the second partition 284 storing the installed OS1 270 is the bootable partition. The MBR 244 and the partition table 246 indicate that the second partition 284 is the active bootable partition, according to the FIG. 2B embodiment. Thus, when the computer system 166 boots from the flash memory 225, the installed OS1 270 stored in the second partition 284 of the flash memory 225 will be launched and executed.

According to one embodiment, the MBR 244 and partition table 246 can be modified to indicate that the first partition 282 or another non-shown partition is the active bootable portion, and another OS stored in that partition of the flash memory 225 should be launched and executed.

As noted above, in one embodiment, a user can specify which operating system to install from which bootable storage device. Therefore, in one embodiment, to provide a user an opportunity to enter a setup mode to thereby select which OS to install to the computer system 166 of the digital signage device, initially the installer 260 is configured, as necessary, to specify that subsequent to the CPU reading and executing the installer 260, the installer will receive an OS installation specification from a system user.

According one embodiment, upon receipt of the user's selection, the installer 260 creates a new partition in the flash memory in which the specified OS will be installed. For example, in the FIG. 2B embodiment, the installer 260 creates partition 2 284. Subsequently, as shown in the FIG. 2B embodiment, the installer 260 copies the image of the specified OS1 240 to the second partition 284 as OS1 270. According to one embodiment, the copied OS1 270 includes additional components related to operation of OS1 270. In one embodiment, the additional components include certain software such as a loader 247 and puppet client 245 for communicating with a puppet server 180 of the SDCMS 101.

Additionally, in one embodiment, after copying OS1 270, the puppet client 245, and the loader 247 to the second partition 284, the installer 260 updates the MBR 244 and partition table 246 to specify that OS1 270 in the second partition 284 is the priority operating system. Once the MBR 244 has been appropriately updated, the installer 260 reconfigures the BIOS 232 so that in the next booting process, the computer system 166 can boot the specified operating system (i.e., OS1 270) directly from the second partition 284 of the flash memory 225. More specifically, the BIOS 232 is reconfigured such that it will determine that the flash memory 225 is the device from which an OS should be loaded. Further, the BIOS 232 is configured such that it reads the modified MBR 244 of the flash memory 225, which now indicates that the second partition 284 storing OS1 270 is the active bootable partition. In one embodiment, the BIOS 232 is configured such that after a user completes the user setup mode and specifies an operating system (e.g., OS1 270), at the next boot or power-up, the BIOS 232 boots the previously-installed OS (e.g., OS1 270) without further user intervention. In one embodiment, the BIOS 232 may be configured such that the user enters the setup mode at every boot or power-up and must specify an operating system. Still, in other embodiments, the BIOS 232 may be configured such that the user enters the setup mode by pressing a particular key or sequence of keys.

According to one embodiment, the BIOS 232 then makes partition 2 284 of the flash memory 225 accessible through the file system of the computer system 166 (i.e., the BIOS 232 mounts partition 2 284). Subsequently, in the presently-disclosed embodiment, the BIOS 232 instructs the CPU 220 to read the boot loader 247 from the second partition 284. The boot loader 247 then instructs the CPU 220 to load OS1 270 from the second partition 284. In one embodiment, after the CPU loads OS1 270, control of the computer system 166 is transferred to the now-installed OS1 270.

According to one embodiment, once the loader 247 transfers control to OS1 270, the puppet client 245 can then detect the hardware configuration of the computer system 166 including the CPU 220, the flash memory 225, the disks, I/O devices, network devices, etc., as well as other software modules, storage devices, and the signage device's 160 identifying information. The puppet client 245 is then able to communicate this information to the puppet server 180, which, as previously discussed, compiles and stores information received from the puppet client 245 and maintains a catalog of the hardware and software information specific to the signage device 160.

Further, according to one embodiment, the puppet server 180 provides the puppet client 245 with resources appropriate to the signage device 160 such as configuration parameters, device drivers, software modules, etc., which the puppet client 245 installs and saves to the flash memory 225 or other storage device. According to one aspect, the software modules received from the puppet server 180 of the SDCMS 101 may include a media player manager for managing display of media content on the media player 164 as well as a device control module ("DCM) 162, as shown in FIG. 1, as well as various other software modules.

Further, according to one embodiment, once the puppet client 245 installs the DCM 162, the DCM 162 may provide signage device identifying information to the DSCS 120, which is used to authenticate the signage device 160 and register the signage device 160 to the global network of signage devices managed by the SDCMS 101. As previously noted, such signage device identifying information may include a signage device ID identifying a particular signage device (e.g., 160), one or more group IDs identifying one or more groups to which the signage device belongs, one or more network IDs identifying networks to which the device belongs, or other technical information relating to the device.

Figure 3A:
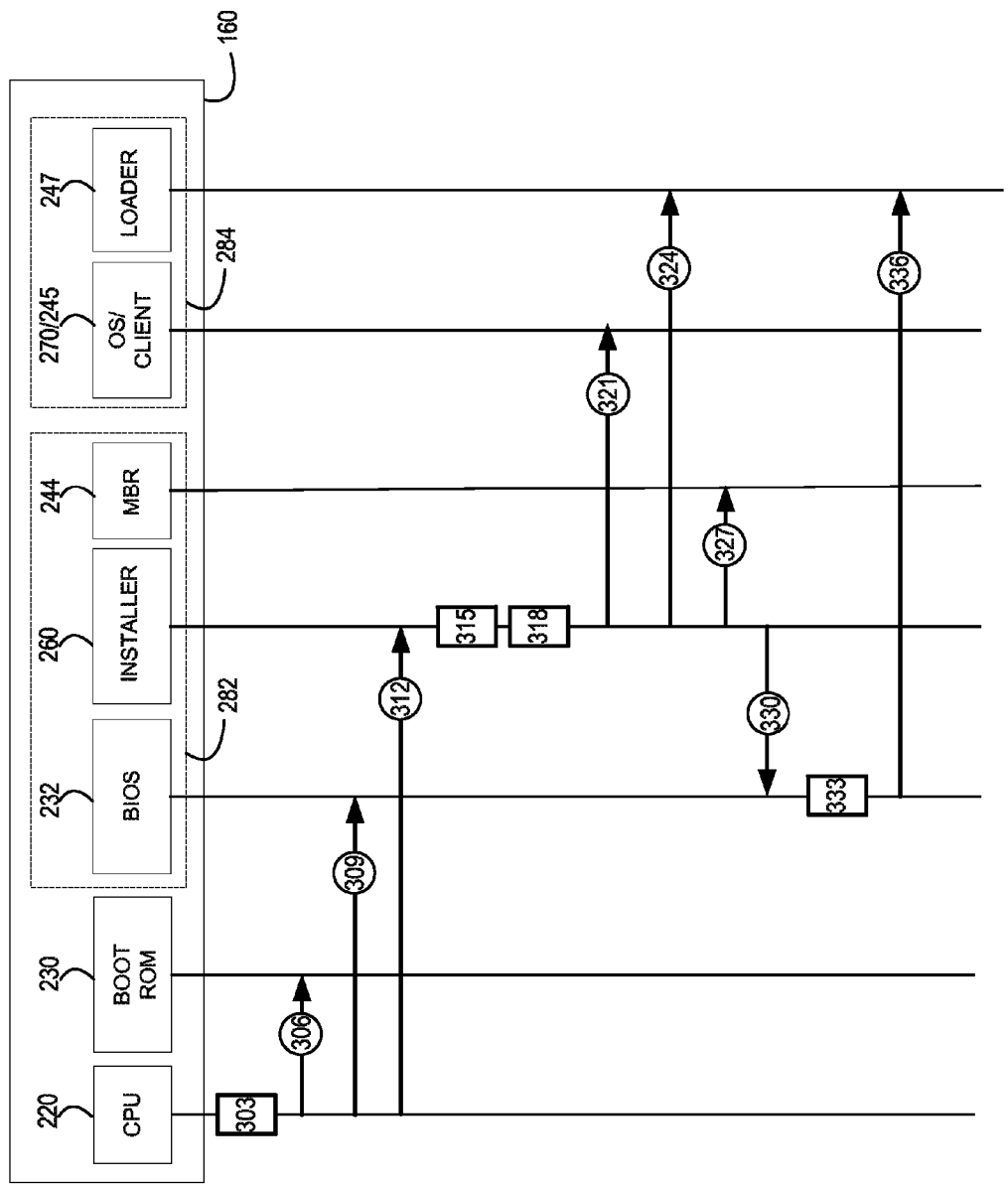
FIGS. 3A and 3B are a sequence diagram showing an exemplary computer-implemented process wherein a specified OS is booted and an SDCMS authenticates the signage device, according to one embodiment of the present disclosure.
Figure 3B:
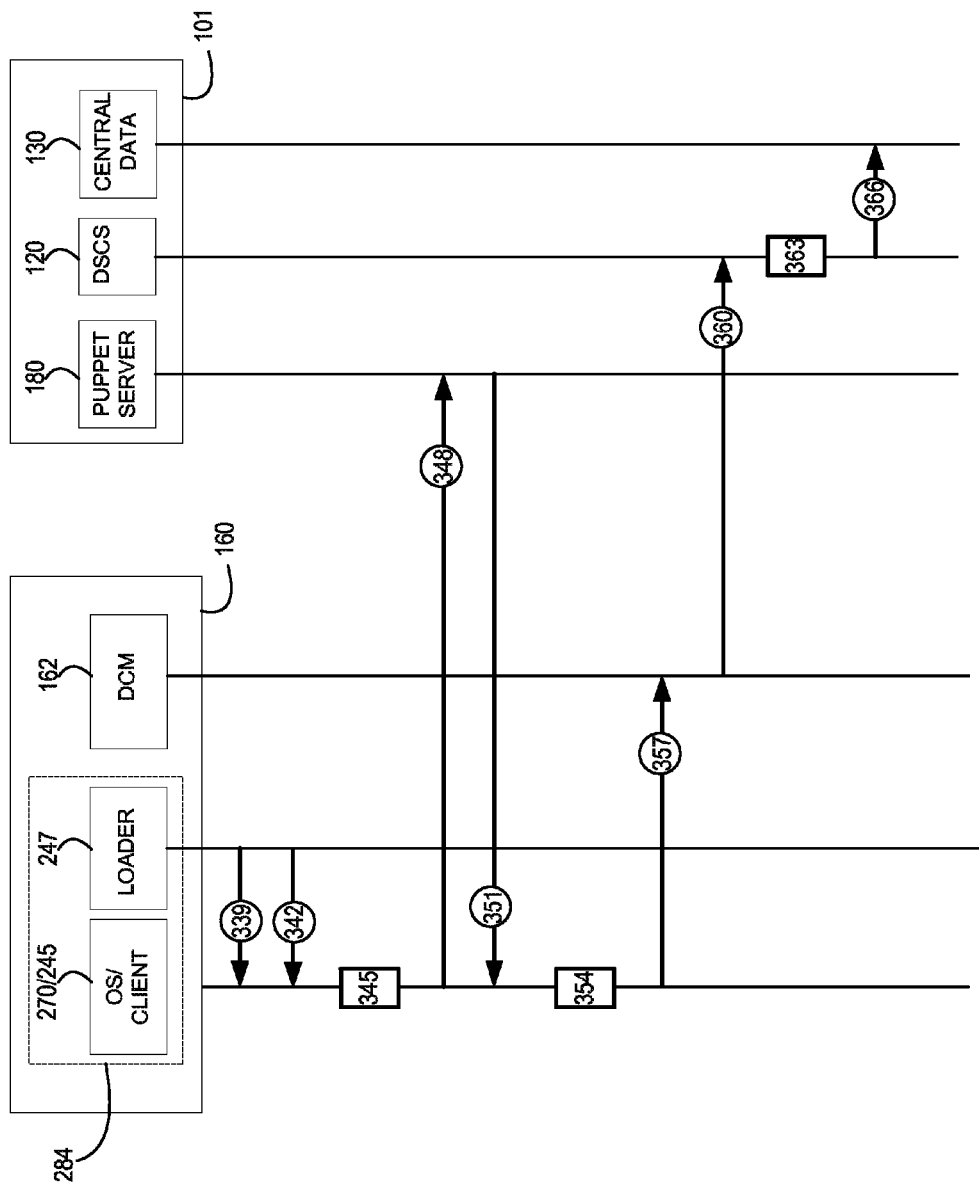

FIGS. 3A and 3B are a sequence diagram showing an exemplary computer-implemented process wherein a specified OS (i.e., OS1 270) is booted and an SDCMS authenticates the signage device, according to one embodiment of the present disclosure.

As shown in FIG. 3A, at operation 303, the CPU 220 is reset or powered on. In certain embodiments, the CPU 220 can be configured to initially load code and configurations stored in the boot rom 230. Thus, at operation 306, the CPU 220 loads and executes the code and the configurations stored in the boot rom 230. The code and the configurations, when necessary, can initialize the flash memory 225. Therefore, the CPU 220 can access the flash memory 225. At operation 309, the code and the configurations can load the BIOS 232 from a preset location of the first partition 282 of the flash memory 225.

At operation 312, the BIOS 232 instructs the CPU 220 to load and execute the installer 260, according to the FIG. 3A embodiment. The BIOS 232 detects a bootable device, when the bootable device does not have an active partition with an active operating system, the BIOS 232 executes the installer 260 to load an operating system, and when the bootable device exists in the signage device 160, the BIOS 232 mounts the bootable device, and executes a bootable operating system stored in the bootable device. Subsequently, at 315, the installer receives an input from a user specifying an operating system (and the location of the operating system) to install onto the computer system 166. In the present example, as discussed previously, a user specifies a desire to install OS1, and the OS1 image 240 is stored in the flash memory 225. At operation 318, after receiving the user's choice of operating system to install (i.e., OS1 240), the installer 260 creates a new partition in the flash memory 225. Then, at operation 321, the installer 260 copies the image of the specified OS1 240 into the newly-created second partition 284 as OS1 270, which in one embodiment includes the puppet client 245. As previously discussed, in one embodiment, the OS1 image 240 includes additional components related to the operation of OS1 270, which may include software such as a loader 247, which is copied to the second partition 284 at operation 324.

In the FIG. 3A embodiment, subsequent to copying OS1 270 and the associated software (e.g., the puppet client 245 and loader 247) to the second partition 284, at operation 327, the installer 260 updates the MBR 244 and partition table 246 such that OS1 270 in the second partition 284 is specified as the priority operating system. At operation 330, the installer 260 reconfigures the BIOS so that the computer system 166 can boot the specified operating system directly from the second partition 284 of the flash memory 225 at the next booting process.

As shown in the FIG. 3A embodiment, at operation 333, the BIOS 232 mounts partition 2 284 (i.e., makes the second partition 284 of the flash memory 225 accessible through the file system of the computer system 166). Then, according to the FIG. 3A embodiment, at operation 336, the BIOS 232 instructs the CPU 220 to read the boot loader 247 from the second partition 284 of the flash memory 225.

Moving to FIG. 3B, in one embodiment, at 339, the boot loader 247 instructs the CPU 220 to load OS1 270 from the second partition 284. Subsequently, at 342, after the CPU loads OS1 270, control of the computer system 166 is transferred to the now-installed OS1 270, as shown in the FIG. 3B embodiment.

After control of the computer system is transferred to the newly-installed operating system (OS1 270), according to one embodiment, at 345, the puppet client 245 scans the computer system 166 to detect the hardware configuration and any software applications installed on the signage device 160. Subsequently, the puppet client 245 transmits the information relating to the hardware configuration and software modules to the puppet server 180, at 348. As previously discussed, the puppet server 180 is able to use the received information to provide appropriate resources to the signage device 160 that allow the signage device 160 to work within the global network of signage devices managed by the SDCMS 101.

As discussed, after analyzing the information received from the puppet client 245, the puppet server 180 transmits resources appropriate to the signage device 160 (such as configuration parameters, device drivers, software modules, etc.) to the puppet client 245, at 351. According to the FIG. 3B embodiment, upon receipt of the resources, the puppet client 245 installs and stores the resources, at 354. As indicated, the resources may include various software modules, which generally include a device control module ("DCM") 162, which is configured to carry out and coordinate various computer-implemented processes of the signage device 160. In the FIG. 3B embodiment, after storing the resources, the puppet client 245 launches the DCM 162, at 357. The DCM 162 then establishes communication with the DSCS 120 of the SDCMS 101, as previously discussed. At 360, the DCM 162 transmits signage device identifying information to the DSCS 120 such that the DSCS 120 can authenticate the signage device 160 and add the signage device 160 to the global network of managed signage devices.

Upon receipt of the signage device identifying information, at 363, the DSCS 120 registers the signage device 160 based on the received information. As previously noted, the signage device identifying information may include a signage device ID identifying a particular signage device (e.g., 160), one or more group IDs identifying one or more groups to which the signage device belongs, one or more network IDs identifying networks to which the device belongs, or other technical information relating to the device. Subsequently, after registering the device, the DSCS 120 stores the signage device identifying information in a signage device data structure (i.e., 125) to the central data module 130, at 366.

Systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor. Method steps according to the claimed invention can be performed by a programmable processor executing a program of instructions to perform functions of the claimed invention by operating based on input data, and by generating output data. The claimed invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (application-specific integrated circuits).

The foregoing description of the exemplary embodiments has been presented only for the purposes of illustration and description and is not intended to be exhaustive or to limit the inventions to the precise forms disclosed. Many modifications and variations are possible in light of the above teaching. The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A system comprising:
   a signage device comprising a processor and an electronic non-volatile computer storage device having a first partition; and
   a management server, configured to send information solicited by the signage device to the signage device only in response to receiving request for the information by the signage device and send only the solicited information to the signage device,
   wherein the first partition stores a plurality of operating system images, a computer-executable boot program, and a computer-executable installer program;
   wherein the boot program, when executed at the processor, is configured to
      detect a bootable device of the signage device, when the bootable device does not have an active partition with a bootable operating system, execute the installer program at the processor to load an operating system, and when the bootable device has an active partition with a bootable operating system, mount the bootable device, and execute the bootable operating system stored in the bootable device; and wherein the installer program, when executed at the processor, is configured to receive a user input indicating one of the operating system images as a selected operating system image to be installed on the signage device, create a second partition in the electronic non-volatile computer storage device, install a copy of the selected operating system image in the second partition as the bootable operating system for the signage device, and configure the second partition as the bootable device for the signage device;

wherein the bootable operating system comprises a computer-executable program, when executed at the processor, configured to receive resources appropriate for the signage device from the management server, wherein the resources comprises a device control module (DCM); and in response to receiving the resources from the management server, install the resources, comprising the DCM, on the signage device, wherein the DCM, when installed on the signage device and executed at the processor, is configured to transmit system identifying information relating to the signage device to the management server.

2. The system of claim 1, wherein the electronic non-volatile computer storage device is a flash memory device.

3. The system of claim 1, wherein the boot program is a Basic Input/Output System (BIOS) or a Unified Extensible Firmware Interface.

4. The system of claim 1, wherein the computer-executable program of the bootable operating system, when executed at the processor, is further configured to detect configuration information of the signage device, and transmit the configuration information to the management server, wherein the management server is configured to receive the configuration information from the signage device, determine the resources appropriate for the signage device based on the received configuration information, wherein the resources being determined comprise the DCM, and transmit the resources, comprising the DCM, to the signage device.

5. The system of claim 4, wherein the configuration information comprises information relating to the processor, disks, I/O devices, network devices, and software modules of the signage device.

6. The system of claim 4, wherein the resources appropriate for the signage device comprise configuration parameters, device drivers, and software modules for the signage device.

7. The system of claim 6, wherein the software modules comprise the DCM.

8. The system of claim 7, wherein the system identifying information comprises a signage device identifier, a signage device group identifier, and a signage device network identifier.

9. The system of claim 7, wherein the management server is further configured to receive the system identifying information from the executed DCM; and register the signage device to a managed global network based on the system identifying information.

10. A method of installing an operating system for a signage device configured to communicate with a management server, comprising:

executing, at a processor of the signage device, a computer-executable boot program stored in a first partition of an electronic non-volatile computer storage device, wherein the first partition stores a plurality of operating system images, the boot program, and a computer-executable installer program;

detecting, by the executed boot program, a bootable device of the signage device;

when the bootable device does not have an active partition with a bootable operating system, executing, by the boot program, the computer-executable installer program stored in the first partition at the processor to load an operating system;

receiving, at the executed installer program, a user input indicating one of the operating system images stored in the first partition as a selected operating system image to be installed on the signage device;

creating, by the executed installer program, a second partition in the electronic non-volatile computer storage device;

installing, by the executed installer program, a copy of the selected operating system image in the second partition as a bootable operating system for the signage device; and configuring, by the executed installer program, the second partition as the bootable device, wherein the bootable program, when re-executed at the processor, is configured to detect the second partition as the bootable device, mount the second partition, and execute the bootable operating system stored in the second partition, wherein the management server is configured to send information solicited by the signage device to the signage device only in response to receiving request for the information by the signage device and send only the solicited information to the signage device;

wherein the bootable operating system comprises a computer-executable program, when executed at the processor, configured to receive resources appropriate for the signage device from the management server, wherein the resources comprises a device control module (DCM); and in response to receiving the resources from the management server, install the resources, comprising the DCM, on the signage device, wherein the DCM, when installed on the signage device and executed at the processor, is configured to transmit system identifying information relating to the signage device to the management server.

11. The method of claim 10, wherein the electronic non-volatile computer storage device is a flash memory device.

12. The method of claim 10, wherein the boot program is a Basic Input/Output System (BIOS) or a Unified Extensible Firmware Interface.

13. The method of claim 10, wherein the computer-executable program of the bootable operating system, when executed at the processor, is further configured to detect configuration information of the signage device, and transmit the configuration information to the management server, wherein the management server is configured to
receive the configuration information from the signage device,
determine the resources appropriate for the signage device based on the received configuration information, wherein the resources being determined comprise the DCM, and
transmit the resources, comprising the DCM, to the signage device.

14. The method of claim 13, wherein the configuration information comprises information relating to the processor, disks, I/O devices, network devices, and software modules of the signage device.

15. The method of claim 13, wherein the resources appropriate for the signage device comprise configuration parameters, device drivers, and software modules for the signage device.

16. The method of claim 15, wherein the software modules comprise, wherein the DCM, wherein the system identifying information comprises a signage device identifier, a signage device group identifier, and a signage device network identifier.

17. The method of claim 16, wherein the management server is further configured to
receive the system identifying information from the executed DCM; and
register the signage device to a managed global network based on the system identifying information.

18. A non-transitory computer readable medium storing computer executable codes, wherein the codes, when executed at a processor of a signage device configured to communicate with a management server, are configured to
detect a bootable device for the signage device, wherein the signage device comprises an electronic non-volatile computer storage device having a first partition, wherein the first partition stores a plurality of operating system images and a computer-executable installer program,
when the bootable device does not have an active partition with an active a bootable operating system, receive a user input indicating one of the operating system images as a selected operating system image to be installed on the signage device,
create a second partition in the electronic non-volatile computer storage device,
install a copy of the selected operating system image in the second partition as the bootable operating system for the signage device, and
configure the second partition as a bootable device for the signage device such that in a rebooting process, the codes are configured to
detect the second partition as the bootable device,
mount the second partition, and
execute the bootable operating system stored in the second partition, wherein the management server is configured to send information solicited by the signage device to the signage device only in response to receiving request for the information by the signage device and send only the solicited information to the signage device;
wherein the bootable operating system comprises a computer-executable program, when executed at the processor, configured to
receive resources appropriate for the signage device from the management server, wherein the resources comprises a device control module (DCM); and
in response to receiving the resources from the management server, install the resources, comprising the DCM, on the signage device, wherein the DCM, when installed on the signage device and executed at the processor, is configured to transmit system identifying information relating to the signage device to the management server.

19. The non-transitory computer readable medium of claim 18, wherein the electronic non-volatile computer storage device is a flash memory device.

20. The non-transitory computer readable medium of claim 18, wherein the computer-executable program of the bootable operating system, when executed at the processor, is further configured to
detect configuration information of the signage device, and transmit the configuration information to the management server,
wherein the management server is configured to
receive the configuration information from the signage device,
determine the resources appropriate for the signage device based on the received configuration information, wherein the resources being determined comprise the DCM, and
transmit the resources, comprising the DCM, to the signage device.

21. The non-transitory computer readable medium of claim 20, wherein the configuration information comprises information relating to the processor, disks, I/O devices, network devices, and software modules of the signage device.

22. The non-transitory computer readable medium of claim 20, wherein the resources appropriate for the signage device comprise configuration parameters, device drivers, and software modules for the signage device.

23. The non-transitory computer readable medium of claim 22, wherein the software modules comprise the DCM, wherein the system identifying information comprises a signage device identifier, a signage device group identifier, and a signage device network identifier.

24. The non-transitory computer readable medium of claim 23, wherein the management server is further configured to
receive the system identifying information from the executed DCM; and
register the signage device to a managed global network based on the system identifying information.

* * * * *